United States Patent [19]

Morton et al.

[11] 3,764,870
[45] Oct. 9, 1973

[54] CONTROL SYSTEMS FOR BATTERY OPERATED VEHICLES

[75] Inventors: John Morton, Hazel Grove; Keith Drummond Stevens, Marple; Graham Spencer Thexton, Marple Bridge, all of England

[73] Assignee: Cableform Limited, Romiley, Stockport, Cheshire, England

[22] Filed: Jan. 20, 1972

[21] Appl. No.: 219,313

[30] Foreign Application Priority Data
Jan. 20, 1971 Great Britain..................... 2,812/71

[52] U.S. Cl................. 318/139, 318/341, 318/391, 318/395, 318/400
[51] Int. Cl........................... H02p 7/28, H02p 1/04
[58] Field of Search.................... 318/139, 341, 332, 318/309, 346, 391, 392, 395, 400

[56] References Cited
UNITED STATES PATENTS
3,517,290   6/1970   Gunsser......................... 318/341 X
3,500,161   3/1970   Domann et al. ................. 318/341 X
3,349,309   10/1967  Dannettell ..................... 318/139 X
3,297,930   1/1967   Payne ........................... 318/341 X Primary Examiner—J. D. Miller
Assistant Examiner—H. Huberfeld
Attorney—Holman & Stern

[57] ABSTRACT

In some control systems for controlling the supply of electrical energy from a battery to the electric motor of a vehicle it is desirable in certain circumstances to use the maximum available current which may be in excess of that available through a thyristor type D.C. switch. Rather than increase the rating of the D.C. switch to cope with these occasional demands there are provided a by-pass contactor having contacts which, when closed, shunt the D.C. switch, means operable by a speed controller in its maximum speed demand condition included in an enabling circuit of the by-pass contactor and time delay means for delaying the energisation of the by-pass contactor as a function of the motor current.

8 Claims, 1 Drawing Figure

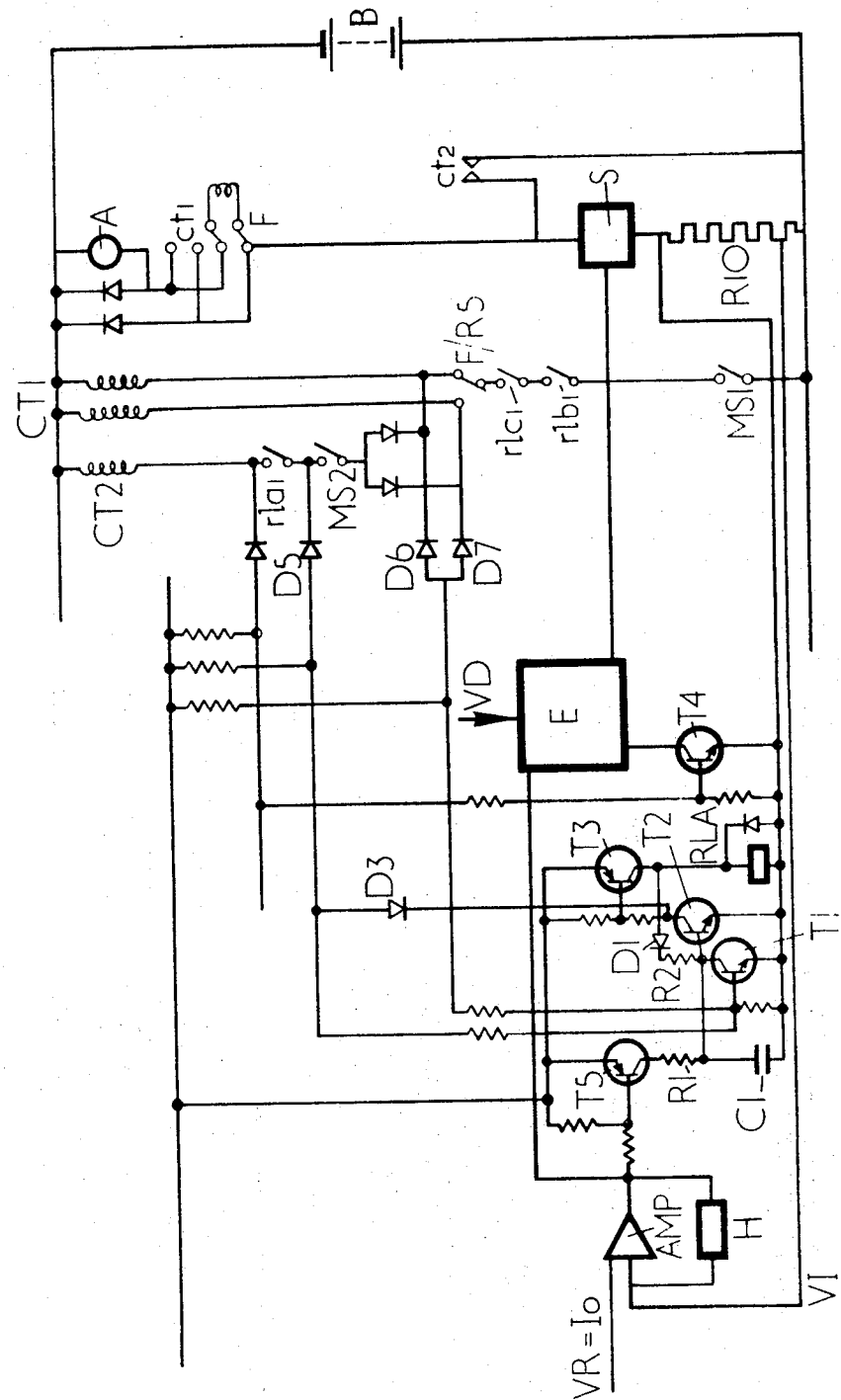

CONTROL SYSTEMS FOR BATTERY OPERATED VEHICLES

This invention relates to the control systems for controlling the supply of electrical energy from a battery to the motor of vehicle.

It is known to control the supply of current to the motor utilizing a D.C. switch including thyristors which supply pulses of current under the control of pulse generator, the frequency and/or mark-space of the pulses generated being varied in accordance with the desired current flow to the motor.

In some operational condition the maximum current provided by such a D.C. switch is not sufficient and it is desirable to connect the motor directly across the battery by means of a by-pass contactor the contacts of which shunt the D.C. switch.

An object of the present invention is to provide an improved control system which enables the use of a by-pass contactor operable in certain conditions.

According to the invention, a control system for the electric motor of a battery operated vehicle, comprises a D.C. switch for controlling the supply of current from a battery to the electric motor, a by-pass contactor having contacts which, when closed, shunt the D.C. switch, means operable by a speed controller in its maximum speed demand condition included in an enabling circuit of the by-pass contactor and time delay means for delaying the energisation of the by-pass contactor as a function of the motor current.

Conveniently, the time delay is proportional to the motor current.

An embodiment of the invention will now be described with reference to the accompanying drawing which is a schematic circuit diagram of a control system for a fork-lift truck.

The armature A of an electric drive motor is connected in series, via the contacts $ct1$ of a forward-/reverse contactor CT1, with the field winding F, a D.C. switch S and a small resistor R10, across a battery B. The forward/reverse contactor CT1 is energised via a start microswitch MS1 on the speed control pedal of the vehicle, trip relay contacts $rlb1$, other interlock relay contacts represented by contacts $rlc1$ and a forward/reverse switch F/R S.

Shunting the D.C. switch and the resistor R10 are the contacts $ct2$ of a by-pass contactor CT2 and it is required that the contactor should be energised only in the following conditions.

1. start microswitch $MS_1$, trip relay contacts $rlb1$, other interlock contacts $rlc1$ are closed and forward or reverse is select on switch F/R S.

2. speed control pedal is completely depressed so closing a by-pass microswitch MS2.

3. a sufficient time has elapsed from starting to supply current to the motor to prevent the motor being started via the by-pass contactor.

With conditions 1 and 2 met the base bias on a transistor $T_1$ is removed via diodes D5 and D6 or D7 so that transistor $T_1$ is switched off and a capacitor C1 is free to charge.

As disclosed in our copending application Ser. No. 74456 filed Sept. 22, 1970, now abandoned, and in continuing application No. 272,882 of July 18, 1972, a voltage proportional to mean motor current is taken from series resistor R10 and compared with a reference voltage VR representing a threshold current $I_0$. After the threshold is exceeded, and amplifier AMP with feedback H provides an output signal which is combined in unit E with the demand signal VD from the speed control pedal to provide a modified control signal to the D.C. switch S. Unit E is prior art and constitutes any known comparator circuit providing a difference signal output as used in typical servo systems. The amplifier output is also connected to one end of a potentiometer supplying the base of a transistor T5 so that the collector current is reduced as the amplifier output increases. The collector load is a resistor $R_1$ and the capacitor C1 which is now free to charge in a time inversely proportional to the motor current and therefore torque. It is required that the time for the by-pass contactor to close in large for high motor current or torque and reduces with fall in current.

Transistors T2 and T3 together with diode D1 and resistor R2 form a bi-stable switching circuit which is initially in the condition of both transistors being switched off. When the voltage on capacitor C1 reaches a predetermined level, transistors T2 and T3 become conductive so that relay RLA is energised, the $rla rea1$ thereof completing the circuit of by-pass contactor CT2. Due to the inhibiting action of diode D3 on clamp transistor $T_1$, relay RLA remains energised and by-pass contactor CT2 can be opened and closed solely by means of microswitch MS2 at the extreme movement of the speed controller until such times as the switches and contacts F/R S, $rlc1$, $rlb1$ and MS1 are opened. This releases relay RLA by enabling clamp transistor T1 to become conductive and discharge capacitor C1.

Transistor T4 is used to switch off D.C. switch S prior to operation of by-pass contactor CT2 and to ensure that it remains off until by-pass contactor CT2 can be opened.

The arrangement in accordance with the invention may with advantage be used with the arrangement of our co-pending application Ser. No. 74457 now abandoned, and its continuation Ser. No. 272,882 which shows a D.C. switch with D.C. gating of the cummutating thyristor. In such a combination the commutating capactior (shown as C1 in the figures of the drawing of application Ser. No. 74457 and application Ser. No. 272,882 as a suppression capacitor and considerably reduces the arcing of the by-pass contactor contacts.

What is claimed is:

1. A control system for the electric motor of a battery operated vehicle, comprising a D.C. switch for controlling the supply of current from a battery to the electric motor, a by-pass contactor having contacts which, when closed, shunt the D.C. switch, means operable by a speed controller in its maximum speed demand condition included in an enabling circuit of the by-pass contactor and time delay means for delaying the energisation of the by-pass contactor as a function of the motor current.

2. A system as claimed in claim 1, wherein a signal proportional to the motor current controls the delay time of the time delay means, a clamp means being provided to prevent the time delay means from operating until predetermined conditions are met.

3. A system as claimed in claim 1, wherein a signal proportional to the motor current controls the rate of charge of a capacitor which remains clamped by clamping means until predetermined control contacts are closed and the speed controller is in its maximum demand condition.

4. A system as claimed in claim 3, wherein the signal proportional to the motor current is obtained by including a resistor in the current path of the motor, the voltage developed across the resistor being used to control the current through a transistor included in the charging path of the capacitor.

5. A system as claimed in claim 3, wherein the clamping means comprises a transistor connected across the capacitor and being conductive until said predetermined conditions are met.

6. A system as claimed in claim 3, wherein the voltage developed across the capacitor due to charging is fed to a bi-stable switching circuit which changes state when the capacitor voltage reaches a predetermined level and thereby causes energisation of a relay having contacts included in the energisation circuit of the by-pass contactor.

7. A system as claimed in claim 4, wherein the voltage developed across the resistor in the path of the motor current is compared with a reference voltage representing a threshold current the resultant signal, when the voltage representing the motor current exceeds the reference voltage, being used to control the charging of the capacitor.

8. A system as claimed in claim 1, wherein means is provided to switch-off the D.C. switch immediately prior to operation of the by-pass contactor and to ensure that it remains off until the by-pass contactor can be opened.

* * * * *